US011623754B2

(12) United States Patent
Marom

(10) Patent No.: US 11,623,754 B2
(45) Date of Patent: Apr. 11, 2023

(54) ICING DETECTOR

(71) Applicant: ISRAEL AEROSPACE INDUSTRIES LTD., Lod (IL)

(72) Inventor: Daniel Marom, Petah Tikva (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 233 days.

(21) Appl. No.: 16/634,720

(22) PCT Filed: Jul. 26, 2018

(86) PCT No.: PCT/IL2018/050837
§ 371 (c)(1),
(2) Date: Jan. 28, 2020

(87) PCT Pub. No.: WO2019/026066
PCT Pub. Date: Feb. 7, 2019

(65) Prior Publication Data
US 2020/0207478 A1 Jul. 2, 2020

(30) Foreign Application Priority Data
Jul. 31, 2017 (IL) .......................... 253739

(51) Int. Cl.
B64D 15/20 (2006.01)
B64D 15/22 (2006.01)
(Continued)

(52) U.S. Cl.
CPC ............. B64D 15/20 (2013.01); B64D 15/22 (2013.01); G01L 19/0007 (2013.01); B64D 2033/0233 (2013.01)

(58) Field of Classification Search
CPC ..... B64D 15/20; B64D 15/22; G01L 19/0007; B64C 1/1453
See application file for complete search history.

(56) References Cited

U.S. PATENT DOCUMENTS 2,229,740 A 1/1941 William
2,681,409 A 6/1954 Dobbins
(Continued)

FOREIGN PATENT DOCUMENTS

CN 105369334 A 3/2016
DE 2624801 A1 12/1977
(Continued)

OTHER PUBLICATIONS

"A New Technology De-Ice Anti Ice Proposal", http://www.iasa-intl.com/folders/belfast/laissez-faire.html, 2019, 3.
(Continued)

Primary Examiner — Timothy D Collins
Assistant Examiner — Eric Acosta
(74) Attorney, Agent, or Firm — Dorsey & Whitney LLP

(57) ABSTRACT

A number of devices are provided for detecting presence of ice in an airstream. In some examples such device includes a housing defining a first chamber and a second chamber, and a partition wall separating the first chamber and the second chamber. The first chamber has at least one inlet opening on a front housing wall facing the airstream, and at least one outlet opening, smaller than the at least one inlet opening. The second chamber is configured for being operatively coupled to at least one electromagnetic (EM) system that is configured for transmitting EM energy to the first chamber at least via the partition wall, which is transparent and/or translucent with respect to the EM energy, the EM energy being configured for melting ice that can accrete with respect to the inlet opening. The device is configured for being operatively coupled to at least one air pressure sensor in fluid communication with the first chamber for detecting at least pressure changes in the first chamber responsive to ice accretion on the inlet opening.

17 Claims, 9 Drawing Sheets

(51) Int. Cl.
  *G01L 19/00* (2006.01)
  *B64D 33/02* (2006.01)

(56) References Cited

U.S. PATENT DOCUMENTS

| | | | |
|---|---|---|---|
| 2,724,106 A * | 11/1955 | Fraser | B64D 15/20 |
| | | | 340/580 |
| 4,461,178 A | 7/1984 | Chamuel | |
| 4,553,137 A | 11/1985 | Marxer et al. | |
| 4,681,450 A | 7/1987 | Azzam | |
| 4,797,660 A | 1/1989 | Rein, Jr. | |
| 5,191,791 A | 3/1993 | Gerardi et al. | |
| 5,296,853 A | 3/1994 | Federow et al. | |
| 5,400,144 A | 3/1995 | Gagnon | |
| 5,484,121 A | 1/1996 | Padawer et al. | |
| 5,551,288 A | 9/1996 | Geraldi et al. | |
| 5,760,711 A | 6/1998 | Burns | |
| 5,823,474 A | 10/1998 | Nunnally | |
| 6,010,095 A | 1/2000 | Hackmeister | |
| 6,091,335 A | 7/2000 | Breda et al. | |
| 6,206,325 B1 | 3/2001 | Nunnally | |
| 8,060,334 B1 | 11/2011 | Jarvinen | |
| 9,013,332 B2 | 4/2015 | Meis | |
| 2002/0158768 A1 | 10/2002 | Severson et al. | |
| 2002/0178493 A1 | 12/2002 | Varanasi et al. | |
| 2004/0036630 A1 | 2/2004 | Jamieson et al. | |
| 2004/0231410 A1 | 11/2004 | Bernard et al. | |
| 2007/0176049 A1 | 8/2007 | Greene | |
| 2008/0110254 A1 | 5/2008 | Zhao et al. | |
| 2009/0055036 A1 | 2/2009 | Vozhdaev et al. | |
| 2010/0110431 A1 | 5/2010 | Ray et al. | |
| 2010/0206991 A1 * | 8/2010 | Severson | G08B 19/02 |
| | | | 244/134 F |
| 2011/0067726 A1 | 3/2011 | Cochran et al. | |
| 2012/0036826 A1 | 2/2012 | Dufresne De Virel et al. | |
| 2012/0193477 A1 | 8/2012 | Thorez et al. | |
| 2012/0274938 A1 | 11/2012 | Ray | |
| 2013/0175396 A1 | 7/2013 | Meis et al. | |
| 2014/0184789 A1 | 7/2014 | Meis et al. | |
| 2014/0263260 A1 | 9/2014 | Duncan et al. | |
| 2015/0115053 A1 | 4/2015 | Kopel et al. | |
| 2015/0197346 A1 * | 7/2015 | Jullie | A62C 3/08 |
| | | | 244/129.2 |

FOREIGN PATENT DOCUMENTS

| | | | |
|---|---|---|---|
| DE | 102011102804 A1 * | 12/2012 | B64D 15/20 |
| DE | 102011102804 A1 | 12/2012 | |
| FR | 1270264 A | 8/1961 | |
| GB | 563148 A | 8/1944 | |
| GB | 765802 A | 1/1957 | |
| GB | 1364845 A | 8/1974 | |
| GB | 1561979 A | 3/1980 | |
| GB | 2144850 A * | 3/1985 | G01N 1/2202 |
| JP | 2001329600 A | 11/2001 | |
| JP | 2010029573 A | 2/2010 | |
| JP | 2011110210 | 6/2011 | |
| WO | 2010006946 A1 | 1/2010 | |
| WO | 2011003963 A2 | 1/2011 | |
| WO | 2015114624 A1 | 8/2015 | |

OTHER PUBLICATIONS

"Ice Cat Aircraft Deicing System", http://www.tricamsystems.com/icecat.php, 2004, 3.

"Ice Meister Model 9732 Plastic", New Avionics Corporation Technical Data Sheet, pp. 1-14.

"Ice Meister Model 9732 Plastic Ice Indicator System", New Avionics Corporation User Guide, 2014, pp. 1-11.

"Optimizing the Use of Aircraft Deicing and Anti-Icing Fluids", Airport Cooperative Research Program Report 45, 2011, 104.

Goraj, Zdobyslaw "An Overview of the Deicing and Antiicing Technologies with Prospects for the Future", 24th International Congress of the Aeronautical Sciences, 2004, pp. 1-11.

Mingione, et al., "Flight in Icing Conditions Summary", 1997, 188.

\* cited by examiner

ICING DETECTOR

TECHNOLOGICAL FIELD

The presently disclosed subject matter relates to icing detectors, particularly for aircraft.

BACKGROUND ART

References considered to be relevant as background to the presently disclosed subject matter are listed below:
U.S. Pat. No. 5,823,474
U.S. Pat. No. 9,013,332
U.S. Pat. No. 6,010,095
U.S. Pat. No. 5,296,853
U.S. Pat. No. 5,551,288
WO 2015/114624
U.S. Pat. No. 4,553,137
U.S. Pat. No. 6,206,325
US 2011/067726
DE 102011102804
WO 2010/006946
US 2007/176049
US 2008/110254
U.S. Pat. No. 5,400,144
US 2014/263260
US 2012/274938
U.S. Pat. No. 5,760,711
U.S. Pat. No. 4,461,178
GB 1364845
U.S. Pat. No. 5,191,791
US 2013/175396
U.S. Pat. No. 8,060,334
US 2004/036630
US 2002/158768
US 2012/193477
GB 563148
US 2004/231410
U.S. Pat. No. 6,091,335
U.S. Pat. No. 5,484,121
U.S. Pat. No. 4,797,660
US 2010/110431
U.S. Pat. No. 4,681,450
U.S. Pat. No. 8,060,334
U.S. Pat. No. 6,206,325
US 2011/067726
US 2012/036826
DE 102011102804
WO 2010/006946
DE 2624801
US 2009/055036
GB 1561979
GB 765802
WO 2011/003963
U.S. Pat. No. 2,681,409
U.S. Pat. No. 2,229,740
US 2015/115053
CN 105369334
FR 1270264
JP 2010029573
JP 2011110210
US 2002/178493
JP 2001329600
AN OVERVIEW OF THE DEICING AND ANTIICING TECHNOLOGIES WITH PROSPECTS FOR THE FUTURE, 2004 (http://citeseerx.ist.psu.edu/viewdoc/download?doi=10.1.1.476.6317&rep=rep1&type=pdf).

A new technology De-Ice Anti Ice Proposal (http://www.iasa-intl.com/folders/belfast/laissez-faire.html)

ICE CAT Aircraft Deicing System, 2004 (http://www.trimacsystems.com/icecat.php)

Acknowledgement of the above references herein is not to be inferred as meaning that these are in any way relevant to the patentability of the presently disclosed subject matter.

BACKGROUND

Ice buildup on aircraft, in particular on their aerodynamic lift and control surfaces, can seriously affect the performance and control of the aircraft, sometimes leading to the loss of lift and/or control, and thus of the aircraft.

Ice detectors are often used for the detection of ice buildup, and such detectors have been in use for many years. Such ice detectors can be based on a range of operating principles.

By way of non-limiting example, GB 563,148 discloses an ice-formation detector, enclosed behind the leading edge 6 of an aircraft wing, and comprises a metal chamber 5 having at its forward end a disc 7 of perforated metal to admit pressure air into the chamber during flight, a connection pipe 19 leading to a low-pressure area such as the underside of the wing trailing edge being provided of suitable bore to allow escape of pressure air from the chamber 5 at such a rate that during flight under non-icing conditions there will be maintained a pressure within the chamber which is high enough to act upon a resilient diaphragm 9, covering a hole in the chamber wall, so as to keep separated spring controlled electrical contacts 14, 15. According to this publication, when icing takes place so as to occlude perforations of disc 7 reduction of pressure occurs in the chamber so that contacts 14, 15 are brought together to complete the circuit of an indicator and/or of de-icing means for the disc 7 and other de-icing means such as 6b within the wing structure.

Also by way of non-limiting example, U.S. Pat. No. 6,010,095 provides an icing detector for detecting presence of both rime ice and clear ice in air comprising an ice collecting surface facing an oncoming air stream; light emitting apparatus for emitting a light beam crossing the ice collecting surface, having a prismatic light refracting window for refracting the light beam in a first direction, when no ice is present on the ice collecting surface; light sensing apparatus in a path of the second direction, and annunciating apparatus coupled to the light sensing apparatus for annunciating presence of ice when light is sensed by the light sensing apparatus.

General Description

According to a first aspect of the presently disclosed subject matter, there is provided a device for detecting presence of ice in an airstream, comprising:

housing defining a first chamber and a second chamber, and a partition wall separating the first chamber and the second chamber;

the first chamber having at least one inlet opening on a front housing wall facing the airstream, and at least one outlet opening, smaller than the at least one inlet opening;

the second chamber configured for being operatively coupled to at least one electromagnetic (EM) system that is configured for transmitting EM energy to said first chamber at least via said partition wall, said partition wall being at least one of transparent and translucent with respect to said EM energy, said EM energy being configured for melting ice that can accrete with respect to the at least one inlet opening;

the device being configured for being operatively coupled to at least one air pressure sensor in fluid communication with said first chamber for detecting at least pressure changes in said first chamber responsive to ice accretion on said at least one inlet opening.

According to the first aspect of the presently disclosed subject matter, the device can include one or more of the following features.

For example, said at least air one pressure sensor is coupled to said first chamber via a conduit between said first chamber and said at least air one pressure sensor. Alternatively, for example, said device comprises at least one opening between said first chamber and said second chamber providing free fluid communication therebetween, and wherein said at least air one pressure sensor is coupled to said second chamber via a conduit between said second chamber and said at least air one pressure sensor.

Additionally or alternatively, for example, said air pressure sensor is a pressure transducer.

Additionally or alternatively, for example, the device is made from non-metallic materials. For example, the housing and the partition wall are made from non-metallic materials.

Additionally or alternatively, for example, said at least one inlet opening is in the form of at least one slit. For example, each slit is in the form of a rectangular slit having a length dimension and a width dimension, the length dimension being greater than the width dimension. For example, the length dimension is at least partially vertical with respect to facing airstream. For example, the length dimension is vertical with respect to facing airstream. For example, said length dimension is between 5 mm and 15 mm. For example, said length dimension is about 10 mm. For example, said width dimension is between 0.15 mm and 0.65 mm. For example, said width dimension is about 0.6 mm. For example, a ratio of said length dimension to said width dimension is between 7.7 and 100. For example, a ratio of said length dimension to said width dimension is about 16.67. For example, said at least one slit has longitudinal edges that diverge in an aft direction through a thickness of said front housing wall. For example, said at least one slit has longitudinal edges that are parallel to one another through a thickness of said front housing wall; additionally or alternatively, for example, said longitudinal edges of at least one said slit are angled with respect to a front face of said front housing wall. For example, the device comprises two said slits transversely spaced from one another.

Additionally or alternatively, for example, said EM system is configured for providing laser energy of wavelength of about 1470 nm or about 1550 nm.

Additionally or alternatively, for example, said EM system is configured for providing laser energy of intensity between 0.01 W/mm$^2$ and 0.1 W/mm$^2$.

Additionally or alternatively, for example, said EM system is configured for providing laser energy of intensity 0.03 W/mm$^2$.

Additionally or alternatively, for example, said EM system is further configured for directing said laser energy toward said front housing wall.

Additionally or alternatively, for example, said EM system is configured for directing said laser energy toward said at least one outlet opening.

Additionally or alternatively, for example, said EM system comprises at least one optical fiber accommodated in said second chamber for transmitting EM energy along a respective optical axis.

Additionally or alternatively, for example, the at least one outlet aperture includes a surface tension breaker. For example, said surface tension breaker includes a mechanical stop located just aft of the outlet opening. For example, said mechanical stop is located just aft of the outlet opening. Additionally or alternatively, for example, said mechanical stop has a generally cylindrical or spherical shape. Additionally or alternatively, for example, said mechanical stop projects generally towards and into said outlet opening, and further projects outwards in a general direction away from said outlet opening. Additionally or alternatively, for example, said mechanical stop comprises a continuous surface between an inside of the outlet opening and an outside of the device.

According to a second aspect of the presently disclosed subject matter, there is provided a device for detecting presence of ice in an airstream, comprising:

housing defining a first chamber;

the first chamber having at least one inlet opening on a front housing wall facing the airstream, and at least one outlet opening, smaller than the at least one inlet opening;

the device configured for being operatively coupled to at least one electromagnetic (EM) system that is configured for transmitting EM energy to said first chamber via, said EM energy being configured for melting ice that may accrete on said front wall, especially the at least one inlet opening;

the device being configured for being operatively coupled to at least one air pressure sensor in fluid communication with said first chamber for detecting at least pressure changes in said first chamber responsive to ice accretion on said at least one inlet opening.

According to the second aspect of the presently disclosed subject matter, the device can include one or more of the features disclosed above regarding the device according to the first aspect of the presently disclosed subject matter, mutatis mutandis.

According to a third aspect of the presently disclosed subject matter, there is provided a device for detecting presence of ice in an airstream, comprising:

housing defining a first chamber having at least one inlet opening on a front housing wall facing the airstream, and at least one outlet opening, smaller than the at least one inlet opening;

said first chamber being configured for coupling to at least air one pressure sensor to provide fluid communication with said first chamber for detecting at least pressure changes in said first chamber responsive to ice accretion on said at least one outlet opening;

the at least one inlet aperture being in the form of at least one slit, the at least one slit being at least partially vertical with respect to facing airstream.

According to the third aspect of the presently disclosed subject matter, the device can include one or more of the features disclosed above regarding the device according to the first aspect or the second aspect of the presently disclosed subject matter, mutatis mutandis.

For example, each said slit is in the form of a rectangular slit having a length dimension and a width dimension, the length dimension being greater than the width dimension.

For example, the length dimension is at least partially vertical with respect to facing airstream.

For example, the length dimension is vertical with respect to facing airstream.

For example, said length dimension is between 5 mm and 15 mm.

For example, said length dimension is about 10 mm.

For example, said width dimension is between 0.15 mm and 0.65 mm.

For example, said width dimension is about 0.6 mm.

For example, a ratio of said length dimension to said width dimension is between 7.7 and 100.

For example, a ratio of said length dimension to said width dimension is about 16.67

For example, said at least one slit has longitudinal edges that diverge in an aft direction through a thickness of said front housing wall.

For example, said at least one slit has longitudinal edges that are parallel to one another through a thickness of said front housing wall.

For example, said longitudinal edges are angled with respect to a front face of said front housing wall.

For example, the device comprises two said slits transversely spaced from one another.

According to a fourth aspect of the presently disclosed subject matter, there is provided a device for detecting presence of ice in an airstream, comprising:
housing defining a first chamber having at least one inlet opening on a front housing wall facing the airstream, and at least one outlet opening, smaller than the at least one inlet opening;
said first chamber being configured for coupling to at least air one pressure sensor to provide fluid communication with said first chamber, for detecting at least pressure changes in said first chamber responsive to ice accretion on said at least one outlet opening;
wherein the at least one outlet aperture includes a surface tension breaker.

According to the fourth aspect of the presently disclosed subject matter, the device can include one or more of the features disclosed above regarding the device according to the first aspect or the second aspect or the third aspect of the presently disclosed subject matter, mutatis mutandis.

For example, said surface tension breaker includes a mechanical stop located just aft of the outlet opening.

For example, said mechanical stop is located just aft of the outlet opening.

For example, said mechanical stop has a generally cylindrical or spherical shape.

For example, said mechanical stop projects generally towards and into said outlet opening, and further projects outwards in a general direction away from said outlet opening.

For example, said mechanical stop comprises a continuous surface between an inside of the outlet opening and an outside of the device.

For example, the device being further configured for coupling to at least one electromagnetic (EM) system that is configured for transmitting EM energy to said first chamber, said EM energy being configured for melting ice that can accrete with respect to the at least one inlet opening.

According to the above aspects of the presently disclosed subject matter a number of devices are provided for detecting presence of ice in an airstream. In some examples such device includes a housing defining a first chamber and a second chamber, and a partition wall separating the first chamber and the second chamber. The first chamber has at least one inlet opening on a front housing wall facing the airstream, and at least one outlet opening, smaller than the at least one inlet opening. The second chamber is configured for being operatively coupled to at least one electromagnetic (EM) system that is configured for transmitting EM energy to the first chamber at least via the partition wall, which is transparent and/or translucent with respect to the EM energy, the EM energy being configured for melting ice that can accrete with respect to the inlet opening. The device is configured for being operatively coupled to at least one air pressure sensor in fluid communication with the first chamber for detecting at least pressure changes in the first chamber responsive to ice accretion on the inlet opening.

A feature of at least one example of the presently disclosed subject matter is that effectively a large chamber is provided in the device, via two interconnected chambers, acting as a low pass filter which averages out small changes in the ambient air pressure that in some circumstances could otherwise lead to erroneous determination that there is ice accretion corresponding to a drop in the chamber pressure, when in reality such a drop is due to a sudden drop in the ambient air pressure.

Another feature of at least one example of the presently disclosed subject matter is that the relative sizes of the two chambers allows the primary chamber to have a relatively small volume relative to the secondary chamber. By the primary chamber having a small volume allows the device as a whole to be compact. Furthermore, by having a relative small primary chamber volume, the amount of ice that is accumulated therein is relatively small, requiring less energy to melt the same and evacuate the primary chamber, which can lead to a requirement for a smaller ice melting system, with lower power requirements, than would otherwise be the case.

Another feature of at least one example of the presently disclosed subject matter is that the respective surface tension breaker allows the primary chamber to be evacuated from liquid water with the respective outlet opening having a small flow cross-section. This in turn allows the primary chamber to have a relatively small volume, which in turn allows the device as a whole to be compact. Furthermore, by having a relative small primary chamber volume, the amount of ice that is accumulated therein is relatively small, requiring less energy to melt the same and evacuate the primary chamber, which can lead to a requirement for a smaller ice melting system, with lower power requirements, than would otherwise be the case.

Another feature of at least one example of the presently disclosed subject matter is that by providing the device as a compact device, the device can be mounted eternally with respect to an air vehicle, for example a wing or fuselage, without incurring unacceptable drag or lift penalties.

Another feature of at least one example of the presently disclosed subject matter is that by providing the device with an electromagnetic energy system, in particular a laser-based ice melting system, for melting ice in the primary chamber and inlet openings, it is possible to do so by directly heating the ice and without the necessity to heat the primary chamber itself, which can lead to a requirement for a smaller ice melting system, with lower power requirements, than would otherwise be the case.

Another feature of at least one example of the presently disclosed subject matter is that by providing the device a partition wall between the primary chamber and the secondary chamber, in which the partition wall is transparent of translucent to laser radiation, it is possible to provide the device with an electromagnetic energy system, in particular a laser-based ice melting system, for directly melting ice in the primary chamber and inlet openings via the partition wall, without the necessity to heat the primary chamber itself, which can lead to a requirement for a smaller ice melting system, with lower power requirements, than would otherwise be the case.

Another feature of at least one example of the presently disclosed subject matter is that by providing the device a partition wall between the primary chamber and the secondary chamber, in which the partition wall is transparent of translucent to laser radiation, it is possible to provide the device with an electromagnetic energy system, in particular a laser-based ice melting system, for directly melting ice in the primary chamber and inlet openings via the partition wall, without the necessity to heat the primary chamber itself. This can lead to a requirement for a smaller ice melting system, with lower power requirements, than would otherwise be the case. This can also lead to the whole device or to the rest of the device, in particular the housing, to be made from non-metallic materials.

Another feature of at least one example of the presently disclosed subject matter is that the whole device or much of the device, in particular the housing, can be made from non-metallic materials.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
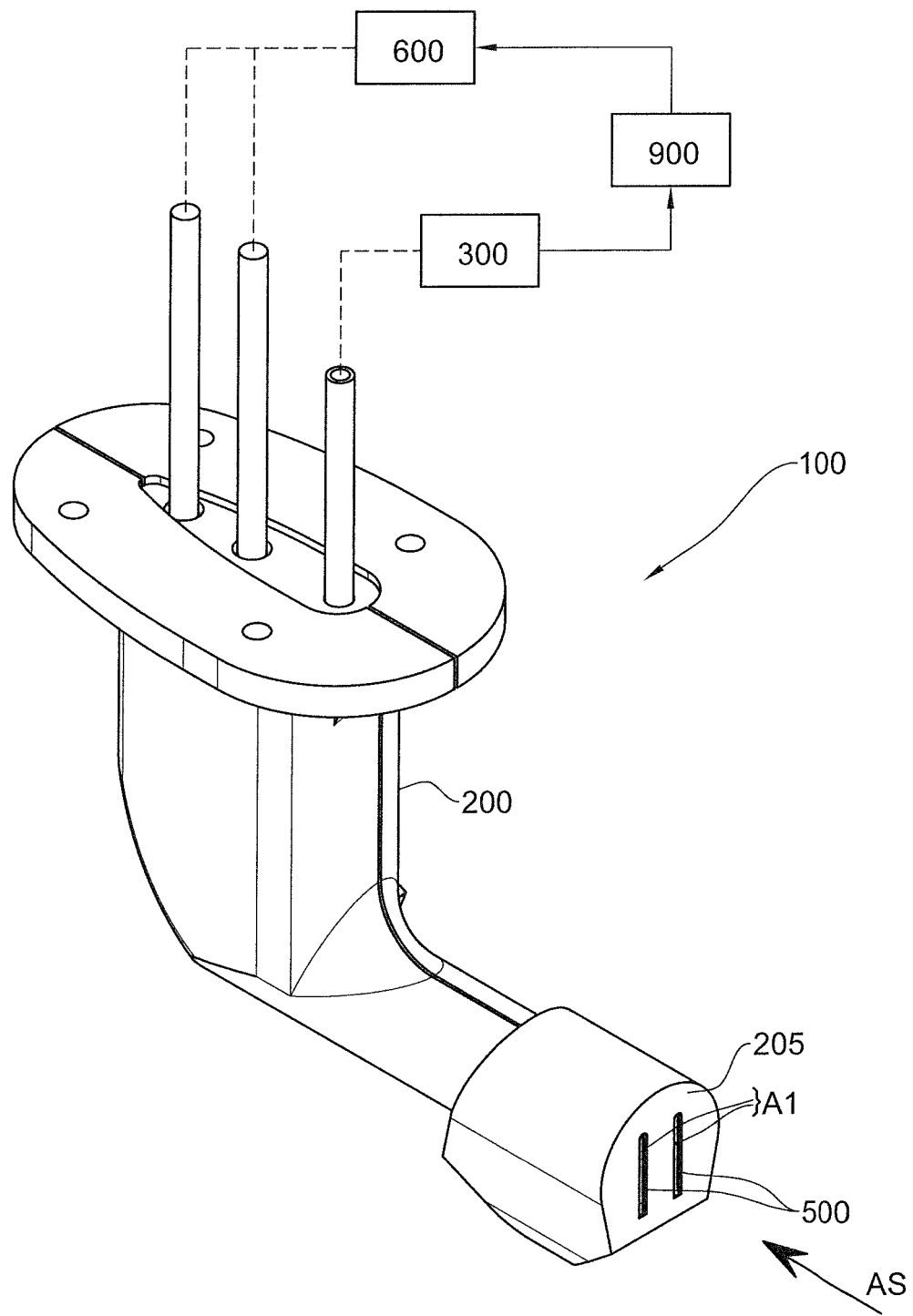
FIG. 1 is an isometric view of a device for detecting presence of ice in an airstream according to a first example of the presently disclosed subject matter.

Referring to FIGS. 1, 2(a), 2(b), 2(c), 2(d), 3, a device for detecting presence of ice in an airstream AS according to a first example of the presently disclosed subject matter, generally designated 100, comprises a housing 200 defining a first chamber 230 and a second chamber 270.

In at least this example, the device 100 comprises, or at least is configured for being operatively connected to, at least to one air pressure sensor 300.

Furthermore, in at least this example, the device 100 comprises, or at least is configured for being operatively connected to, at least to an electromagnetic (EM) system 600.

A partition wall 250 separates the first chamber 230 from the second chamber 270.

The housing 200 in this example is made from two parts, a forward housing part 210 and an aft housing portion 220. In alternative variations of this example the housing 200 can be formed as an integral component, or alternatively can be formed as an assembly of more than two parts.

The aft housing portion 220 defines the second chamber 270, and includes the partition wall 250 at a front end 222 thereof, and an interface aft wall 280 including flange 282, and side walls 260. The device 100 can be mounted to a structure via the interface aft wall 280 and flange 282. Such a structure can include, for example, an aircraft wing, fuselage or any other part of the aircraft on which ice accretion is to be monitored.

In this example, and as best seen in FIGS. 1, 2(a), 2(b), 2(c), 2(d), the aft housing portion 220, in particular an aft portion thereof, has an aerodynamic profile, for example an aerofoil cross-section, for minimizing drag in the airstream AS, and thus the entire device 100 can be exposed to the airstream.

In alternative variations of this example, the aft housing portion 220 can be generally tubular and can have any suitable cross-section—for example circular, elliptical, square, rectangular, polygonal etc.

Figure 2A:
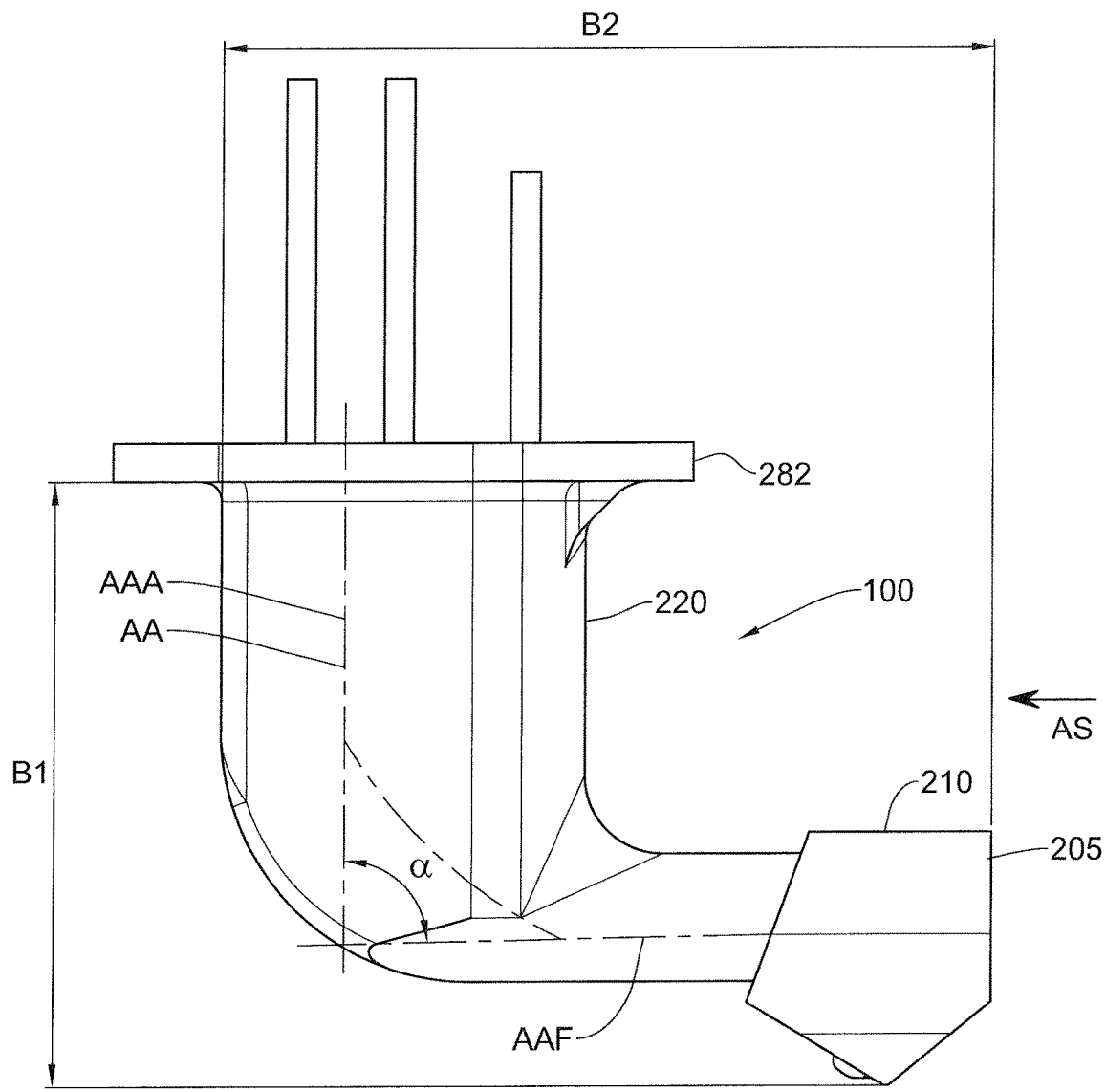
FIGS. 2(a), 2(b), 2(c), 2(d) show the device of FIG. 1 in side view, top view, front view and back view, respectively.
Figure 2B:
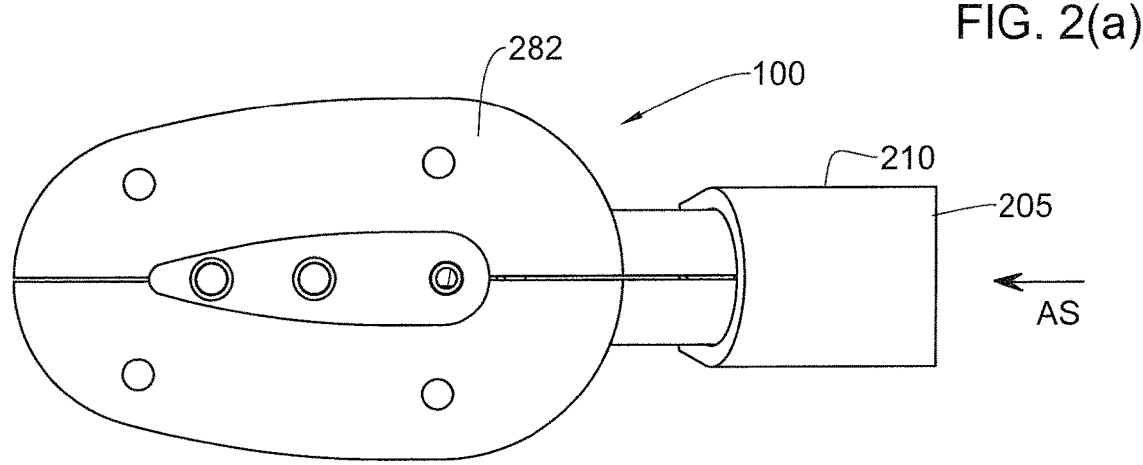

Furthermore, and referring particularly to FIG. 2(a), in this example the aft housing portion 220 is elbow-shaped, i.e., the aft housing portion 220 has a central axis AA therethrough in which a front portion AAF of the central axis AA is angularly displaced from an aft portion AAA of the axis AA by an elbow angle α. In this example the elbow angle α is about 90°.

However, in other alternative variations of this example the aft portion can have any other suitable elbow angle, and/or any other suitable shape; for example in other alternative variations of this example the aft portion 220 can have a rectilinear central axis, and elbow angle α is thus about 180°.

Figure 3:
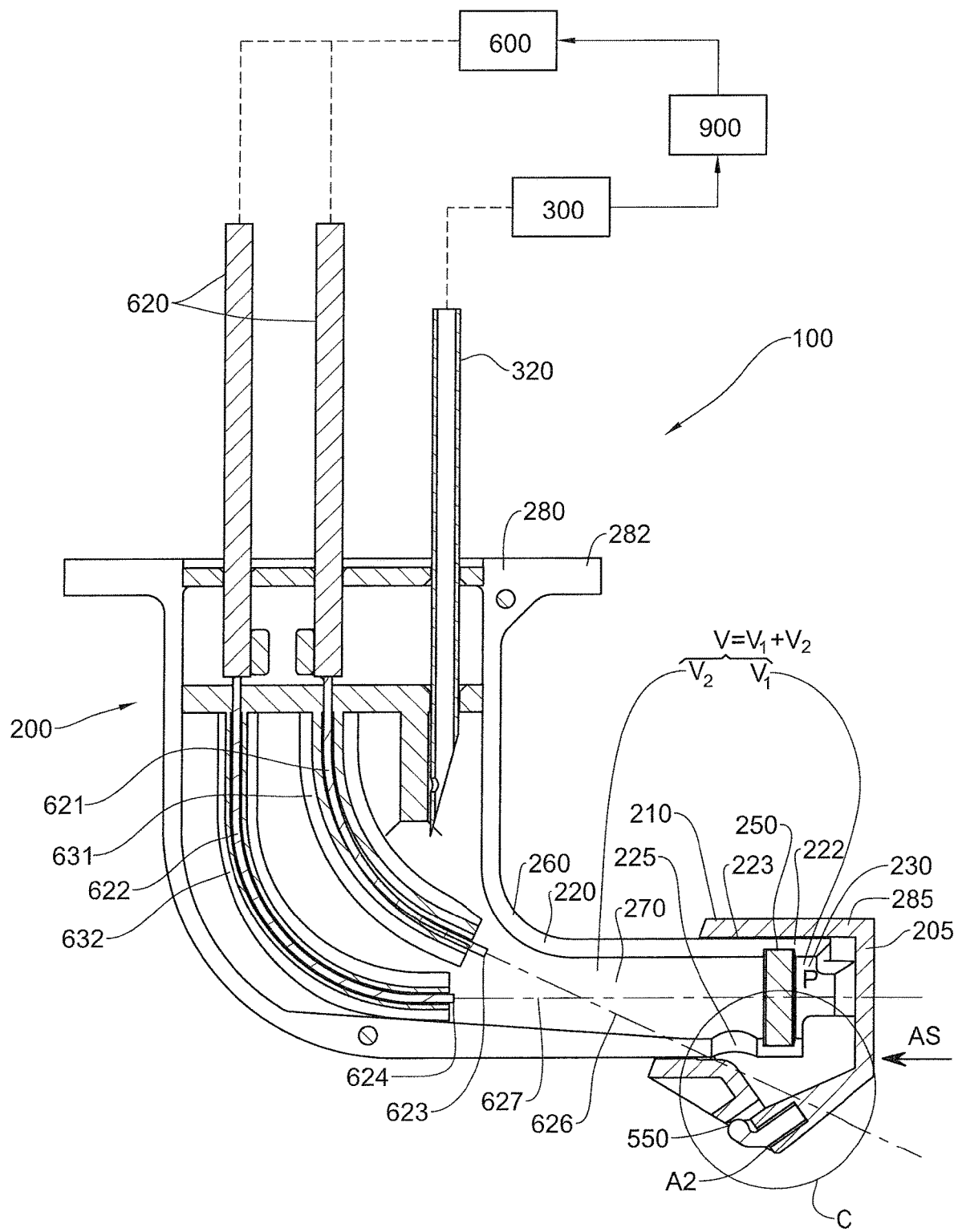
FIG. 3 shows, in cross-sectional side view, the example of FIG. 1 taken along Section A-A in FIG. 2(b).

The forward housing portion 210 is affixed with respect to the aft housing portion 220 at the front end 222. Referring in particular to FIG. 3, the forward housing portion 210 has an open aft end 223 that cooperates with front end 222. The forward housing portion 210 includes front housing wall 205, that in operation of the device 100 is facing the airstream AS, and side walls 285. When affixed to the aft housing portion 220, the forward housing portion 210 defines the first chamber 230, and thus the first chamber 230 is defined by the partition wall 250 side walls 285, and front housing wall 205.

Referring in particular to FIGS. 1, 2(c), 2(d), 3 and 4, the housing 200, in particular the first chamber 230, in this example has a plurality of inlet openings 500 on the front housing wall 205 facing the airstream, and one outlet opening 550 facing a direction generally away from the airstream.

Referring in particular to FIGS. 1 and 3, the total cross-sectional flow area A1 provided by all inlet openings 500 together is larger than the total cross-sectional flow area A2 provided by the outlet opening 550. For example the ratio A1/A2 is about 15 or greater than 15, for example 16, 17, 18, 19, 20, 21, 22, 23, 24, 25, 26, 27, 28, 29, 30. Alternatively, for example the ratio A1/A2 is less than about 15, for example 14, 13, 12, 11, 10, 9, 8, 7, 6, or 5.

In at least this example, the total cross-sectional flow area A1 provided by each the two inlet openings 500 is also larger than the total cross-sectional flow area A2 provided by the outlet opening 550.

Referring in particular to FIG. 3, the housing 200, in this example the aft housing portion 220, includes a chamber opening 225 that provides open fluid communication between the first chamber 230 and the second chamber 270. In this example, other than for the chamber opening 225, the second chamber 270 has no other openings that allow fluid communication between an outside of the housing 200 and the second chamber 270. Thus, in operation of the device 100 the air pressure in the first chamber 230 and in the second chamber 270 are equalized via the chamber opening 225. The first chamber 230 and the second chamber 270 each act as plenum chambers.

Referring to FIG. 3, the first chamber 230 has a first internal volume V1, and the second chamber 270 has a second internal volume V2, the combined volume being designated herein as V (=V1+V2).

The combined internal volume V of the first chamber 230 and the second chamber 270 can be chosen to be large enough to together operate as a low pass filter, i.e., such that small fluctuations in external total pressure do not affect the chamber pressure P. Furthermore, in at least this example, the second internal volume V2 is much larger than the first internal volume V1. This allows for the feature of low pass filter, and also for a relatively small size for the first chamber 230. Having a relatively small first internal volume V1 for the first chamber 230 results in a relatively small volume of ice being accreted therein, and thus requiring in turn less EM energy to melt this ice.

For example the ratio of the second internal volume V2 to the first internal volume V1 is 1 or greater than 1, and can be for example in a range from 1 to any one of the following values: 2, 3, 4, 5, 6, 7, 8, 9, 10, 11, 12, 13, 14, 15, 16, 17, 18, 19, 20, 21, 22, 23, 24, 25,1 26, 27, 27, 28, 29, 30, 31, 32, 33, 34, 35, 36, 37, 38, 39, 40, 41, 42, 43, 44, 45, 46, 47, 48, 49, 50, 60, 70, 80, 90, 100.

For example the ratio of the second internal volume V2 to the first internal volume V1 can be for example any one of the following values: 1, 2, 3, 4, 5, 6, 7, 8, 9, 10, 11, 12, 13, 14, 15, 16, 17, 18, 19, 20, 21, 22, 23, 24, 25,1 26, 27, 27, 28, 29, 30, 31, 32, 33, 34, 35, 36, 37, 38, 39, 40, 41, 42, 43, 44, 45, 46, 47, 48, 49, 50, 60, 70, 80, 90, 100.

The chamber opening 225 is located at a bottom portion of side walls 260, and aft of the partition wall 250. The outlet opening 550 is below chamber opening 225.

In this example, the device 100 comprises one air pressure sensor 300 in fluid communication with the second chamber 270 via conduit 320, and thus the air pressure sensor 300 is operatively coupled to the housing 200 via conduit 320. Alternatively, the device 100 is configured to be connected to the air pressure sensor 300, and thus the device 100 includes a suitable connector for connecting the conduit 320 to the air pressure sensor 300.

Thus, ultimately, in operation the air pressure sensor 300 is in fluid communication with the first chamber 230 (via the opening 225, second chamber 270, and conduit 320), and is configured for detecting at least pressure changes in the first chamber 230 responsive to ice accretion on the inlet openings 500, as will become clearer herein. In at least this example the air pressure sensor 300 is also configured for providing actual pressure readings of the air pressure P in the first chamber 230, and is operatively connected to a controller 900 that also controls operation of at least the electromagnetic (EM) system 600.

In any case, the air pressure sensor 300 can be, for example, any one of the following a General Purpose Pressure Transducer and Transmitter model 55p, provided by Validyne Engineering (USA).

In this example, the device 100 comprises one electromagnetic (EM) system 600 configured for selectively transmitting EM energy to the front housing wall 500 via, i.e., through, said partition wall 250. The EM system 600 is operatively coupled to the housing 200 via a plurality of optical fiber elements 620 accommodated in the second chamber 670. Alternatively, the device 100 is configured to be connected to the EM system 600, and thus the device 100 includes a suitable optical connector for connecting the optical fiber elements 620 to the EM system 600.

The first optical fiber elements 620 can include a single optical fiber or a bundle of optical fibers.

It is to be noted that the partition wall 250 is transparent and/or translucent with respect to the aforesaid EM energy provided by the EM system 600.

It is also to be noted that the aforesaid EM energy is configured for melting ice that in operation of the device 100 can accrete on said front housing wall 205, especially over the inlet openings 500. Accordingly, the intensity I and/or wavelength λ of the EM energy generated by the EM system 600 and transmitted towards the front housing wall 205 are such as to enable any ice that may have accreted on the inlet openings 500 and/or on the front housing wall 205 to become heated directly in response to receiving the EM energy, and to raise the temperature thereof such as to melt this ice, sufficient for such ice to be removed away from the inlet openings 500.

For example such intensity I of the EM energy can be 0.03 W/mm$^2$, or at least between 0.01 W/mm$^2$ and 0.1 W/mm$^2$.

For example such wavelength of the EM energy can be about 1470 nm or 1550 nm.

In this example the EM system 600 includes two optical fiber elements 620, for ease of reference being further identified with reference numerals 621, 622. It is to be noted that in alternative variations of this example the EM system 600 can include only one optical fiber 620 or more than two optical fiber elements.

Each of the optical fiber elements 621, 622 has a respective forward facing transmission end 623, 624, and in operation of the EM system 600 transmits EM energy along respective optical axes 626, 627 in a generally forward direction.

The second chamber 270 comprises channels 631, 632 for guiding the optical fiber elements 621, 622 from at least the interface aft wall 280 to a location just aft of the partition wall, and aligned along optical axes 626, 627 with respect to the front housing wall 205.

In particular, the optical axis 626 of one optical fiber 621 is directed towards, the lower portion of the first chamber 230; thus, in operation of the EM system 600, EM energy transmitted via the optical fiber 621 irradiates the front housing wall 205 and an upper portion of the first chamber 230 via the partition wall 250 enabling ice therein to be melted.

Furthermore, the optical axis 627 of the other optical fiber 622 is directed towards, and intersects, the partition wall 250 and also the front housing wall 205; thus, in operation of the EM system 600, EM energy transmitted via the optical fiber 622 irradiates the lower portion of the first chamber 230 enabling ice therein to be melted.

In any case, the EM system 600 can be, for example, the M1470 product by Photontec (Germany).

In at least this example housing 200, and in particular the forward housing part 210, the aft housing part 220, and the partition wall 250 are made from non-metallic materials. For example, the housing 200 can be made entirely from any suitable plastics materials, or any other suitable materials that are transparent or translucent to the wavelength of the EM energy generated by the EM system 600, for example any one of: polycarbonate, glass.

Alternatively, in some alternative variations of the above examples, the housing 200, and in particular one or more of the forward housing part 210, the aft housing part 220, are made from metallic materials, for example aluminum, titanium, steel, brass, or other suitable metals or alloys, while the partition wall 250 can be made from any suitable plastics materials, or any other suitable materials that are transparent or translucent to the wavelength of the EM energy generated by the EM system 600.

Alternatively, in some alternative variations of the above examples, in which the EM system 600 is omitted or replaced with a non-laser heating system for melting the accreted ice, the housing 200, and in particular one or more of the forward housing part 210, the aft housing part 220, and the partition wall 250 are made from metallic materials, for example aluminum, titanium, steel, brass, or other suitable metals or alloys.

Figure 5:
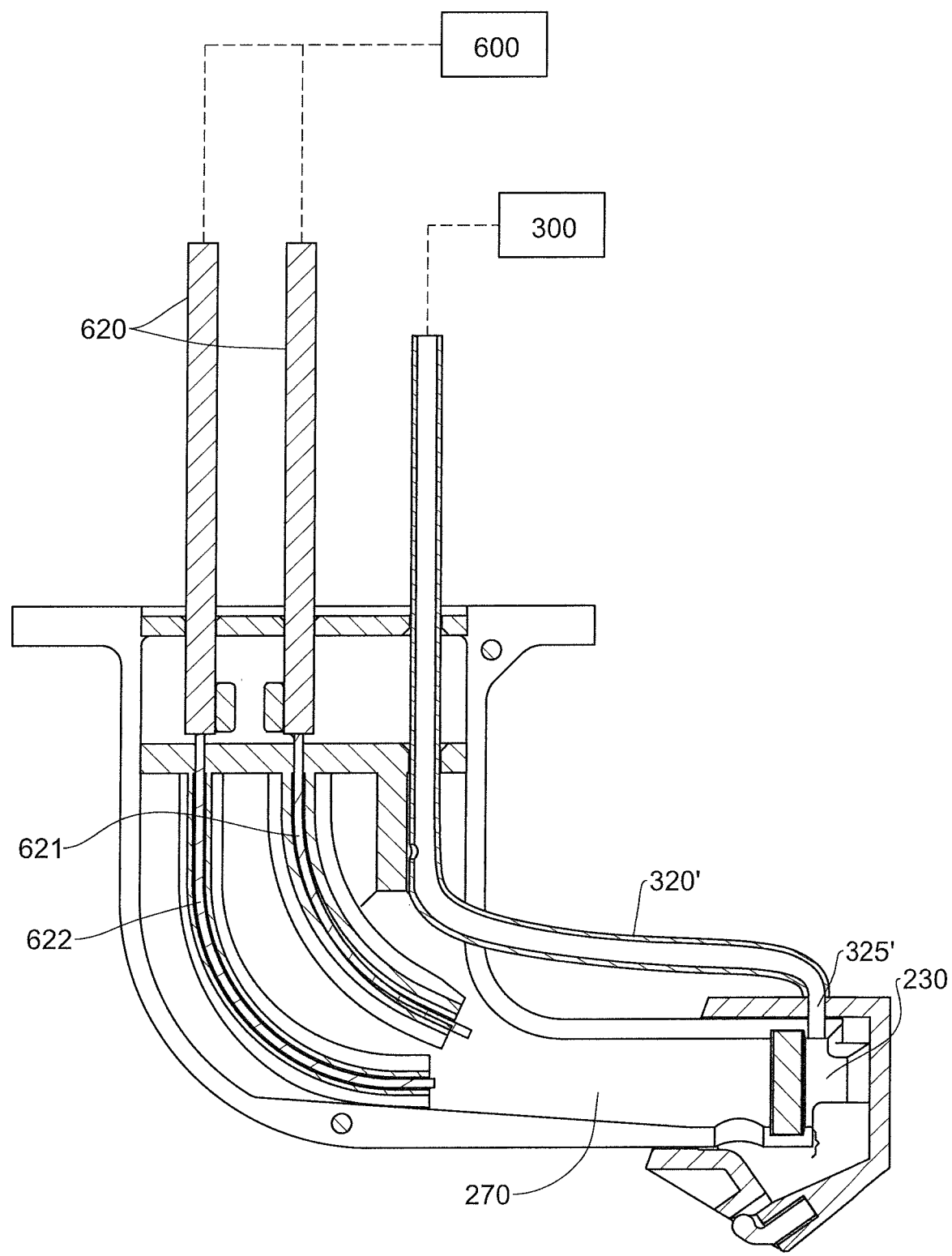
FIG. 5 shows, in cross-sectional side view, an alternative variation of the example of FIG. 3.

In alternative variations of this example, and referring to FIG. 5, the air pressure sensor 300 can be directly coupled to the first chamber 230 rather than to the second chamber 270, for example via modified conduit 320' and first chamber opening 325', without the need for opening 255 between the first chamber 230 and the second chamber 270. For example, in this example there is a lack of fluid communication within the housing 200, between the first chamber 230 and the second chamber 270. The air pressure sensor 300 can be directly coupled to the first chamber 230 via conduit 320'.

Figure 6:
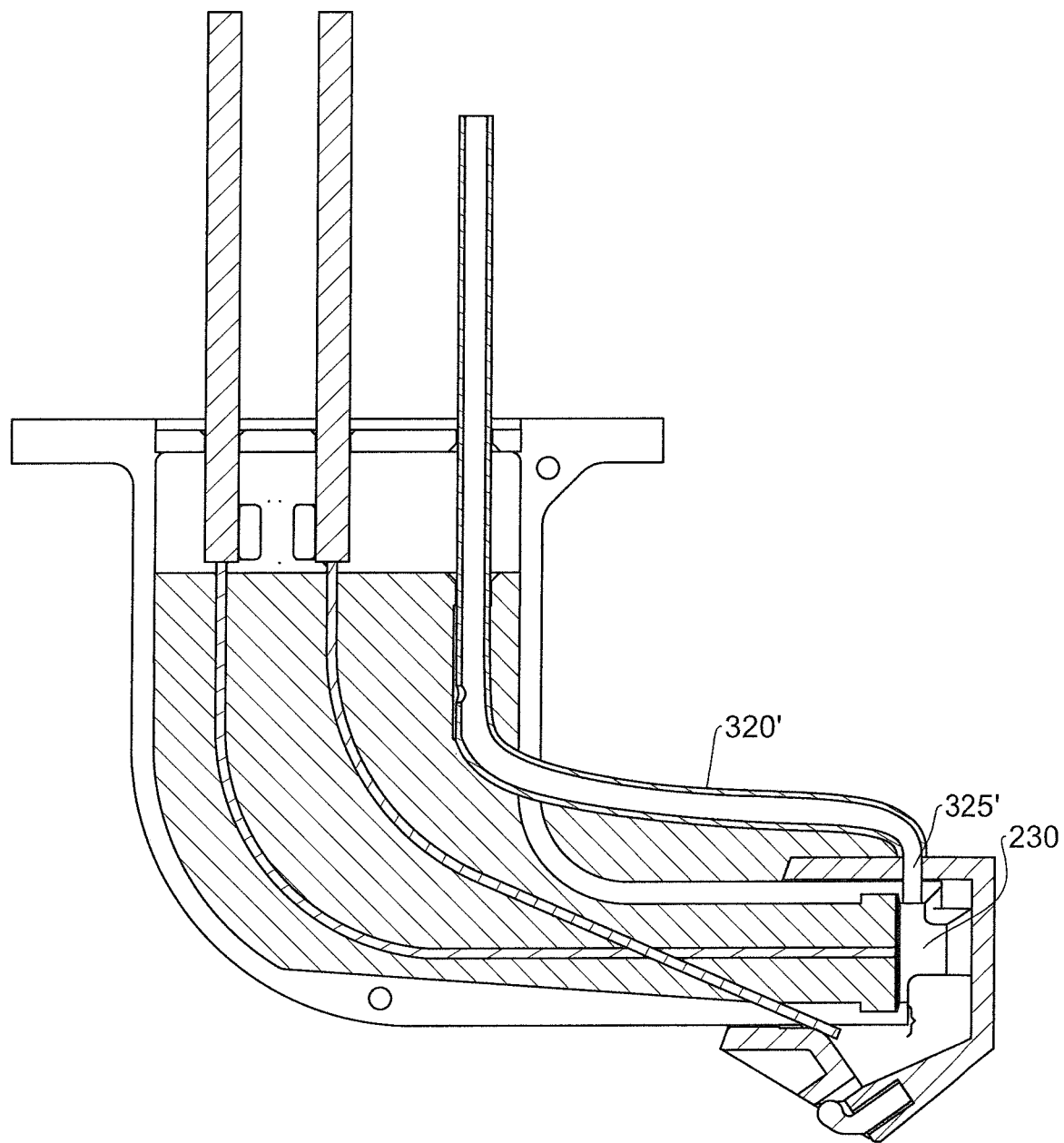
FIG. 6 shows, in cross-sectional side view, another alternative variation of the example of FIG. 3.

Furthermore, in yet other alternative variations of these examples, and referring to FIG. 6 for example, the air pressure sensor 300 can also be directly coupled to the first chamber 230, for example in a similar manner to the example of FIG. 5, mutatis mutandis, i.e., via conduit 320' and first chamber opening 325', and there is no need for the second chamber 270 per se. Thus, in this example, there is no open chamber aft of the first chamber 230, or, alternatively, the second chamber 270 can in fact be filled with material, for example a non-gaseous material, for example a solid material.

Figure 8:
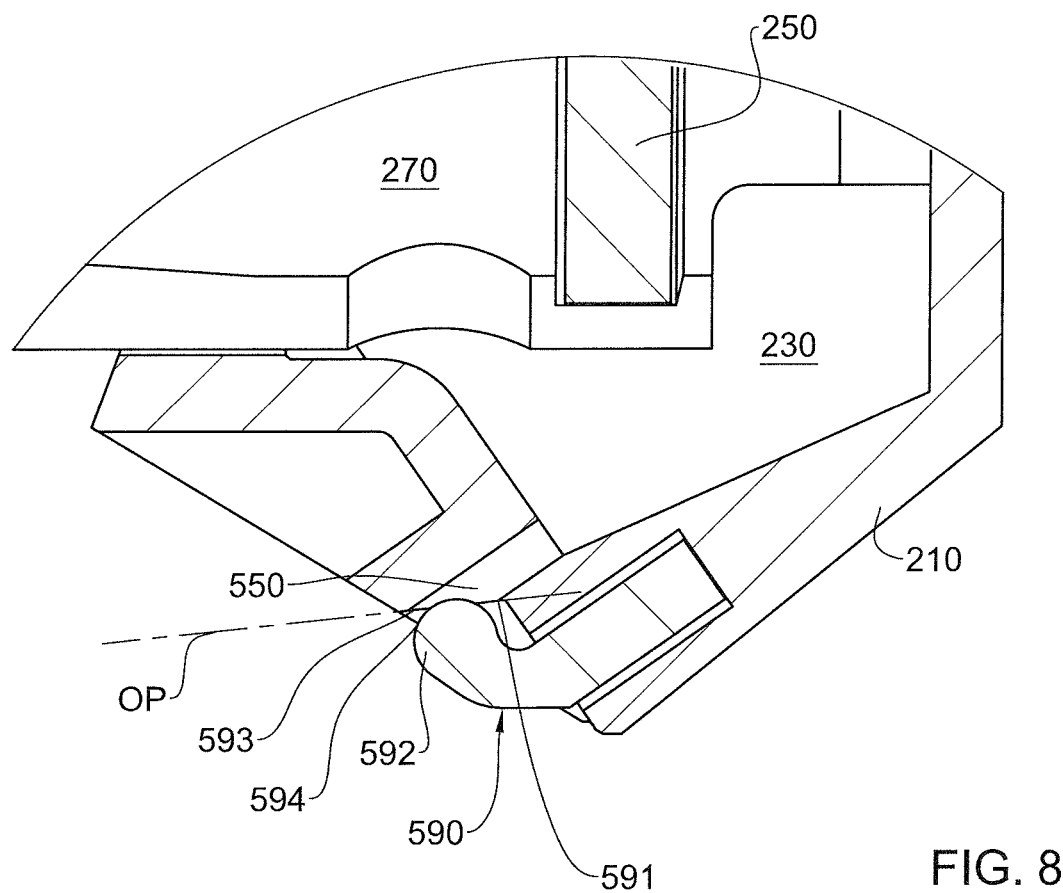
FIG. 8 shows, in cross-sectional side view, detail "C" of the example of FIG. 3.

In at least this example, and referring to FIG. 8 in particular, the outlet opening 550 comprises a surface tension breaker 590 for breaking surface tension of any liquid water that can accumulate in the first chamber 230 above the outlet opening 550 and thus facilitate flow of such liquid water out of the outlet opening 550. The surface tension breaker 590 is of particular use in examples of the device 100 where the device 100 is compact and of relative small dimensions, for example in terms or overall volume of the device and/or in terms of the linear dimensions thereof. Providing such a device having compact and of relative small dimensions can allow the device to be provided as a stand-alone device that can be mounted onto a structure, for example the fuselage or wing of an air vehicle, at minimal drag penalty, and does not need to be embedded within the structure.

For example the outlet opening is in the form of a channel that can have a transverse cross-sectional diameter of about 1 mm, providing an outlet area A2 of about 0.8 mm$^2$. The outlet 591 of the channel is scarfed, and thus the edges 593 of the outlet 591 lies on an outlet plane OP that is slanted with respect to the axis of the channel. Accordingly, the exit area circumscribed by the edges 593 at outlet plane OP is larger than the cross-sectional area of the channel that defines the outlet opening 550.

In at least this example, the surface tension breaker 590 is in the form of an artifact that provides a surface that projects from forward of the outlet (i.e., within the outlet opening 550) to an outside of the outlet 591, sufficiently to essentially allow flow of water from the outlet opening 550 to an outside thereof via this surface, countering the effects of the surface tension of the water.

In at least this example, the surface tension breaker 590, i.e., the artifact, is in the form of a mechanical stop 592, having a generally cylindrical or spherical shape, and located just aft of the outlet opening 550, so that part of the stop 592 projects generally forwards towards, and penetrates the outlet plane OP, as to provide the outlet opening 550 with a generally annular flow area, and the stop also projects aft of the outlet plane OP, providing a continuous surface 594 between the inside of the outlet opening 550 and an outside of the device.

Without being bound to theory, the inventors consider that when liquid water accumulates in the outlet opening 550 (for example as a result of ice in the primary chamber 230 being melted), and this outlet opening is of small diameter, this water runs towards and into the outlet opening 550, and in the absence of the stop 592 would project in a direction away from the outlet plane OP as a result of surface tension (typically in the form of a "bubble" of water. This surface tension essentially overcomes the gravitational forces of the water, and essentially prevents the water from actually exiting the outlet opening 550. However, the presence of the stop 592 provides another surface 594 for the projecting water to attach itself to, and thus spreads over the stop 592, in particular an aft portion thereof, aft of the outlet plane OP, and drips therefrom via gravity, thereby providing a flow of water from the primary chamber 230 to an outside of the device, and minimizing adverse effects of surface tension.

The lower portion of the first chamber 230 is also sloped in at least this example to facilitate the outward flow of any accumulated water in the first chamber 230.

Figure 2C:
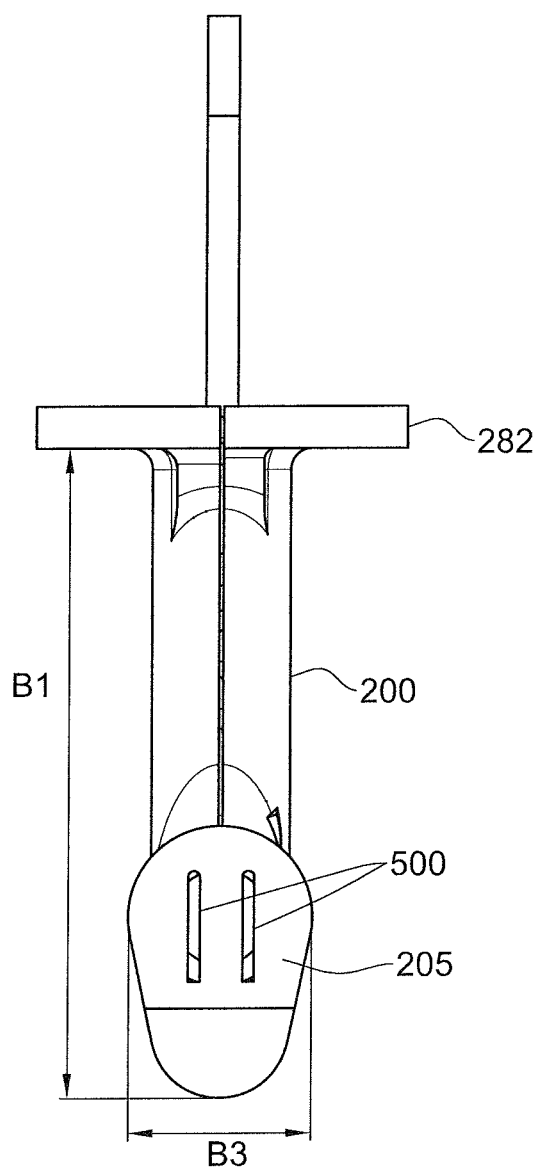
Figure 2D:
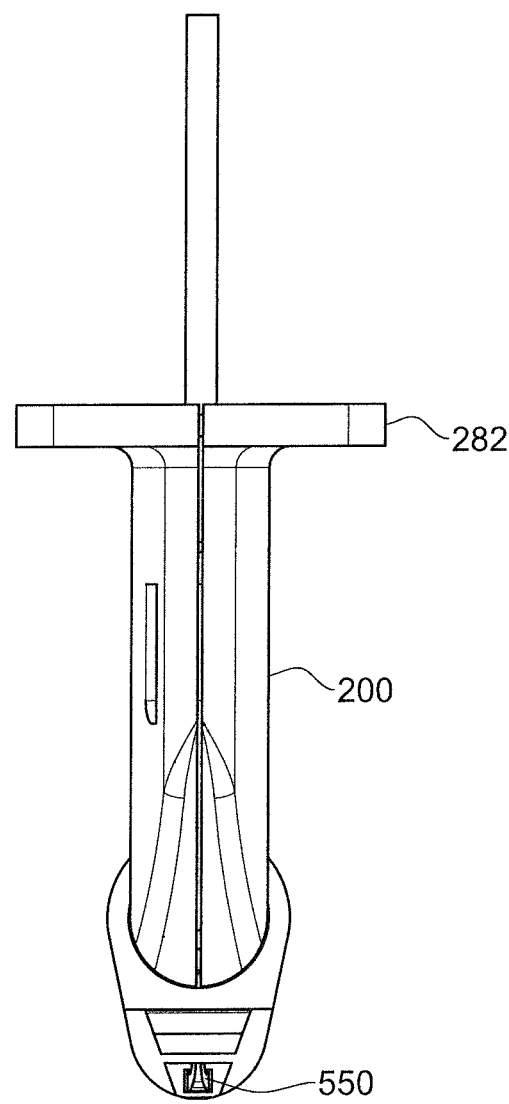

For example, and referring in particular to FIGS. 2(a) and 2(c), the device 100, in particular the housing 200, has a height dimension B1, length dimension B2 and width dimension B3 according to the following examples:

Example 1: B1=60 cm; B2=80 cm; B3=17 cm.
Example 2: B1=60 cm; B2=100 cm; B3=17 cm.
Example 3: B1=40 cm; B2=54 cm; B3=17 cm.
Example 4: B1=35 cm; B2=50 cm; B3=15 cm.

In alternative variations of the above examples, the device 100, in particular the housing 200, can have a height dimension B1, length dimension B2 and width dimension B3, different from the above.

Figure 4:
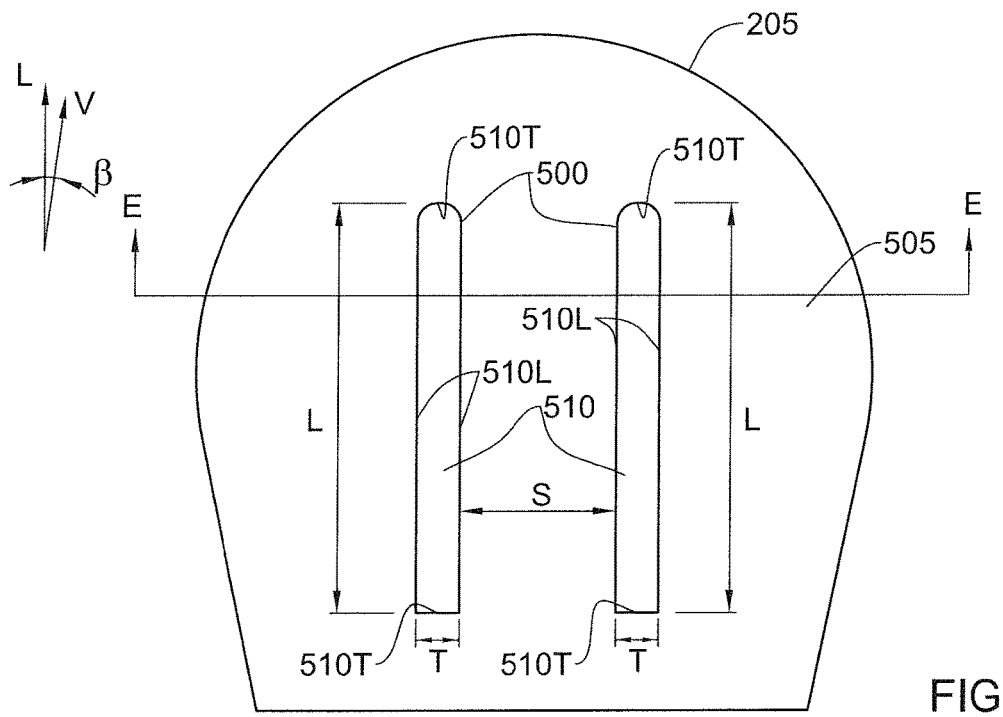
FIG. 4 shows in front view the front housing wall of the example of FIG. 1.

Referring in particular to FIG. 3 and FIG. 4, the housing 200, in particular the first chamber 230, in this example has two inlet openings 500 on the front housing wall 205 facing the airstream. In at least this example, each of the inlet openings 500 is in the form of a slit 510, having a longitudinal edges 510L, having a longitudinal dimension L, and transverse edges 510T, having a transverse dimension T, the longitudinal edges 510L and the transverse edges 510T being in general rectangular arrangement.

Figure 4A:
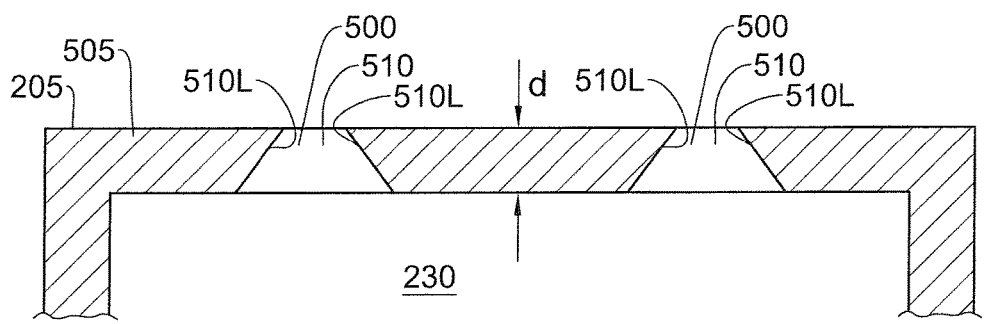
FIG. 4(a) is a cross-sectional partial view of the example of FIG. 4 taken along section E-E.

Referring to FIG. 4(a), in at least this example the longitudinal edges 510L of each slit 510 diverge in an aft direction to provide an increasing flow are along the thickness d of the front housing wall 205.

Figure 4B:
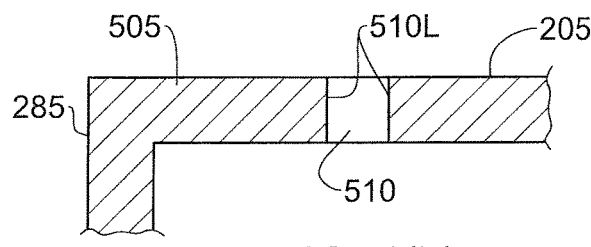
—FIGS. 4(b), 4(c), 4(d) are cross-sectional partial views of alternative variations of the example of FIG. 4(a).
Figure 4C:
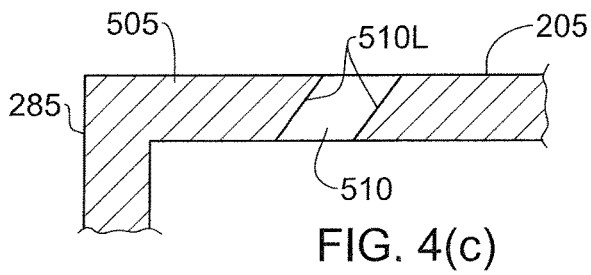
Figure 4D:
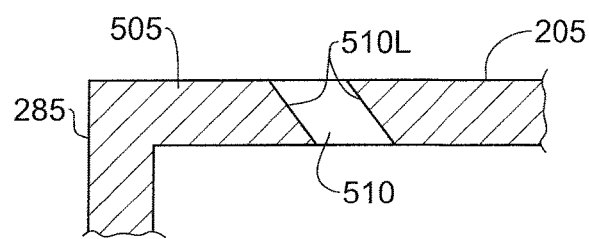

In alternative variations of this example, and referring to FIGS. 4(b), 4(c) and 4(d), the longitudinal edges 510L of each slit 510 are parallel to one another, and can be parallel to front portion AAF of the central axis AA (FIG. 4(b)). Alternatively, the longitudinal edges 510L of each slit 510 are parallel to one another, and can be angled with respect to the front face 505 for diverting the flow towards a side wall 285 (FIG. 4(c)), or away from the side wall 285 (FIG. 4(d)).

Furthermore, in at least this example the two inlet opening 500 are identical in size and shape to one another, and are transversely spaced from one another in the front housing wall 205 by a transverse spacing S.

Furthermore, in at least this example the longitudinal dimension L is 10 mm, or at least between 5 mm and 15 mm, and the transverse dimension T is 0.6 mm, or at least between 0.15 mm and 0.65 mm. In other words the ratio L/T of the longitudinal dimension L to the transverse dimension T is 16.67, or at least between 7.7 and 100.

These values for the longitudinal dimension L and the transverse dimension T can be particularly effective for enabling ice particles of small size (for example diameter 0.15 mm or larger) to accumulate on the slits 510.

Furthermore, in at least this example the longitudinal dimension L is arranged to be in the vertical direction, or at least partially vertical. By partially vertical is meant that the longitudinal dimension L is arranged to be inclined to the vertical direction by an inclination angle β, where angle β is in the range 0° to 45°.

In at least this example, the front face 505 of the front housing wall 205 is on a vertical plane, when in operation of the device 100. However, in alternative variations of this example the front face 505 can be inclined to the vertical when in operation of the device 100: in such cases, angle β can be defined as the inclination of longitudinal dimension L to the vertical direction, where the longitudinal dimension L is projected to a vertical plane. In other words, angle β can be defined as the inclination of longitudinal dimension L to the vertical direction, taken on a vertical plane.

In operation of the device 100, mounted to a structure and facing the airstream AS, air enters first chamber 230 via the two inlet openings 500, and leaves the first chamber 230 via the outlet opening 550, but at a lower rate because of the area ratio A1/A2, thereby elevating the air pressure P within the first chamber 230. This air pressure P is generally higher than the static pressure $P_S$ of the airstream AS. However, in absolute terms the dynamic pressure or the total (pitot) pressure $P_T$ of the airstream AS can vary, and thus can depend on the airspeed of the device (i.e., on the airspeed of the structure (e.g. the aircraft) on which the device 100 is mounted) as well as on the altitude. This total pressure $P_T$ of the airstream AS, can be determined by other sensors, for example via a pitot probe, and optionally the air pressure P within the first chamber 230 can be non-dimensionalised to incorporate the real time values of total pressure $P_T$ and/or altitude pressure effects.

So long as the two inlet openings 500 remain unblocked with respect to the airstream AS, and the full cross-sectional flow area A1 is available to the airstream AS, the air pressure P will remain elevated, and is generally a function of the total (pitot) pressure $P_T$ of the airstream AS.

Furthermore, when there is a presence of ice, which can include for example one or more of supercooled water droplets, snow particles or ice particles, in the airstream AS, some of this ice can begin to accrete on the front housing wall 205, in particular on the front face 505 thereof, more particularly on and/or around the openings 500, for example in a manner analogous to or corresponding to ice accretion that can be taking place on important areas of the aircraft, for example leading edges of the wings or other control surfaces.

As more and more ice accretes over the openings 500, the available open area A1' available for airflow into the first chamber 230 from the airstream AS diminishes, and correspondingly the air pressure P' in the first chamber diminishes from the former nominal air pressure P. When the openings 500 are totally blocked with ice, the available open area A1' available for airflow into the first chamber 230 from the airstream AS is zero, and the pressure P' reaches a minimum. In this manner, changes in the air pressure P within the first chamber 230 can indicate the level of blockage of the openings 500.

As the air pressure sensor 300 is operatively coupled to controller 900, the controller 900 thus receives data or signals from the air pressure sensor 300 indicative of the air pressure P within the first chamber 230, and the controller 900 can then determine the status of ice accretion. The controller 900 can also be configured to determine whether or not the level of ice accretion has reached or passed critical thresholds, according to the drop in pressure of the air pressure in the first chamber 230. Such critical thresholds can correspond to, for example, analogous ice accretions in ice-sensitive parts of the aircraft, for example leading edges of the wings or other control surfaces, which could lead to significant or catastrophic loss in performance of the aircraft.

Responsive to determining the status of ice accretion, in particular whether such thresholds have been reached, the controller 900 can selectively take one or more of the following courses of action:
  (a) Transmit a suitable ice accretion warning signal to the user.
  (b) Initiate operation of any anti-icing systems in the aircraft.
  (c) Activate operation of the EM system 600 to remove the ice accretion over the openings 500.

Regarding option (c), this feature allows the device 100 to continue operating to determine whether there is fresh ice accretion, and to thus monitor ongoing ice accretion. Otherwise, it is possible for the ice already accreted in the openings 500 to remain there, even when there is no further ice present in the airstream, and thus provide false indications to the controller 900.

Nominal operation of the EM system 600 results in melting of ice accreted at the openings 500, and at least part of the melted ice flows into the first chamber 230 and is removed therefrom via the outlet opening 550, and the dynamic pressure of the airstream also assists in this.

Furthermore, the surface tension breaker 590 also assists in preventing the outlet opening 550 from otherwise effectively becoming blocked with water as a result of surface tension, particularly in examples where the device 100 is compact and of small dimensions, as discussed herein.

In alternative variations of this example, the housing 200, in particular the first chamber 230, can have a single inlet opening 500 or more than two inlet openings 500 on the front housing wall 205 facing the airstream, and/or more than one outlet opening 550. Furthermore, the size and shape of such inlet openings 500 and/or of such outlet openings 550 can also vary.

Figure 7A:
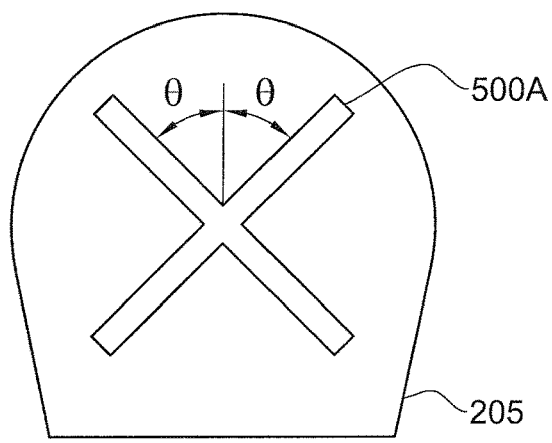
FIG. 7(a) shows in front view an alternative variation of the front housing wall of the examples of FIGS. 1, 5, 6.
Figure 7B:
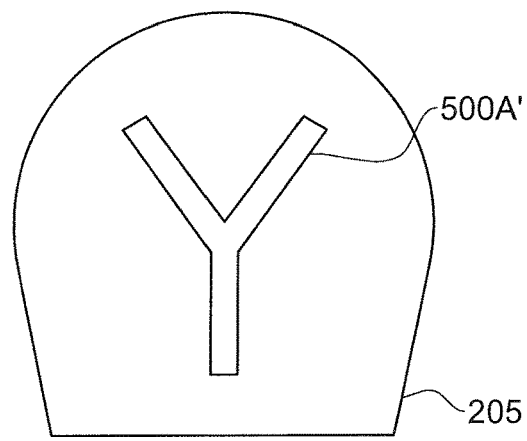
FIG. 7(b) shows in front view another alternative variation of the front housing wall of the examples of FIGS. 1, 5, 6.

For example, FIG. 7(a) shows such an alternative variation of the above examples in which there is a single inlet opening 500A, having an open area of A1. In this example the opening 550A is in the form of two slits 551A intersecting one another in cruciform arrangement, in which each one of the slits 551A is at an angle θ to the vertical, where each angle θ (which can be the same or different from one another) is between 0° and 60°, for example FIG. 7(b) shows a variation of the example of FIG. 7(a), in which there is a single inlet opening 500A' in the form of a "Y".

Figure 7C:
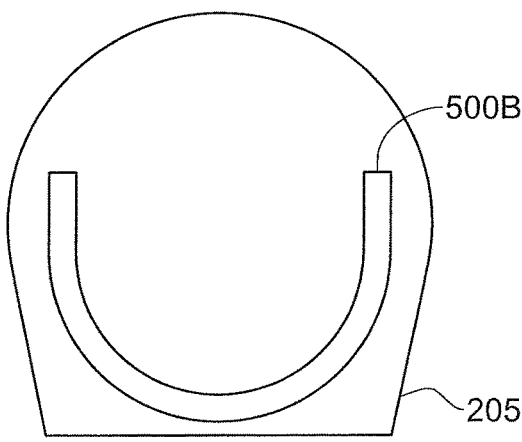
FIG. 7(c) shows in front view another alternative variation of the front housing wall of the examples of FIGS. 1, 5, 6.
Figure 7D:
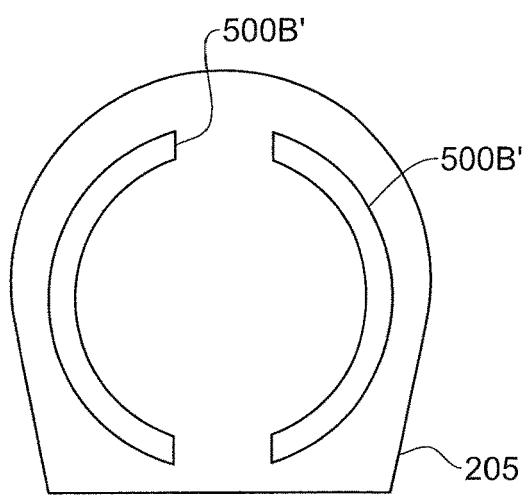
FIG. 7(d) shows in front view another alternative variation of the front housing wall of the examples of FIGS. 1, 5, 6.

In another example illustrated in FIG. 7(c), there is also a single inlet opening 500B, having area A1, also in the form of slit, but in which the slit is not rectilinear, but rather curved. In an alternative variation of this example, and referring to FIG. 7(d) for example, the curved slit can be replaced by a number of shorter slits 500B' together having an open area of A1.

Figure 7E:
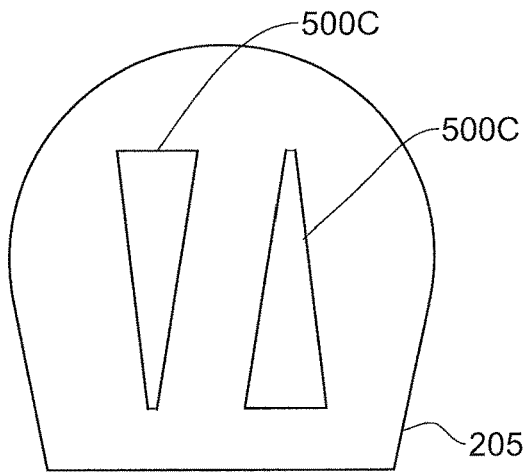
FIG. 7(e) shows in front view another alternative variation of the front housing wall of the examples of FIGS. 1, 5, 6.

It is also to be noted that in alternative variations of this example the opening 500 can be in the form of respective one or more slits, in which the slits are not of uniform width. For example, and referring to FIG. 7(e), such an alternative variation of the above examples in which there are two openings 500C, together having an open area of A1, each opening has a trapezoidal shape or a wedge shape. In the illustrated example of FIG. 7(e), one opening 500B is in the form of a slit being narrow at the top and wider at the bottom, while the other opening is in the form of a slit but wide at the top and narrow at the bottom.

Figure 7F:
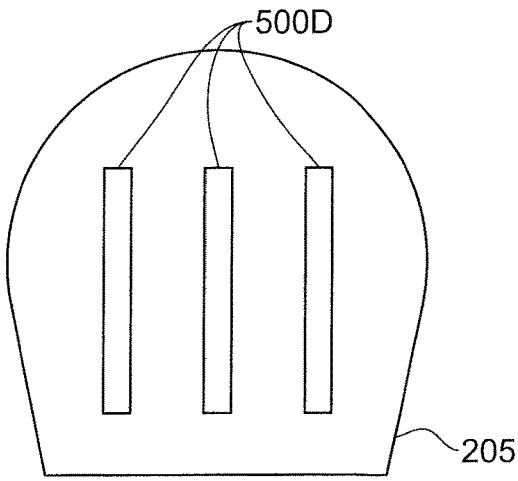
FIG. 7(f) shows in front view another alternative variation of the front housing wall of the examples of FIGS. 1, 5, 6.

In yet another example illustrated in FIG. 7(f), there are three rectangular slits 500D.

It is also to be noted that in general the higher the ratio A1/A2, the less time it will take for the opening 500 to become completely clogged, given a particular set of icing conditions.

Thus, the value of ratio A1/A2, in particular transverse dimension T, can be chosen for a particular device 100 such as to become clogged at a particular set of icing conditions within a desired period of time and that are of particular importance or value to the user.

In this connection, for example, and according to another aspect of the presently disclosed subject matter, a battery of devices 100 can be provided, and installed in an aircraft for example, each such device differing from the other devices in the value of the transverse dimension T and all operatively coupled to controller 900. As icing conditions worsen, one after another of the devices 100 becomes sequentially clogged with ice, providing the user with an indication of how quickly the icing conditions could be changing, and allowing for more time to take counter measures.

Figure 9:
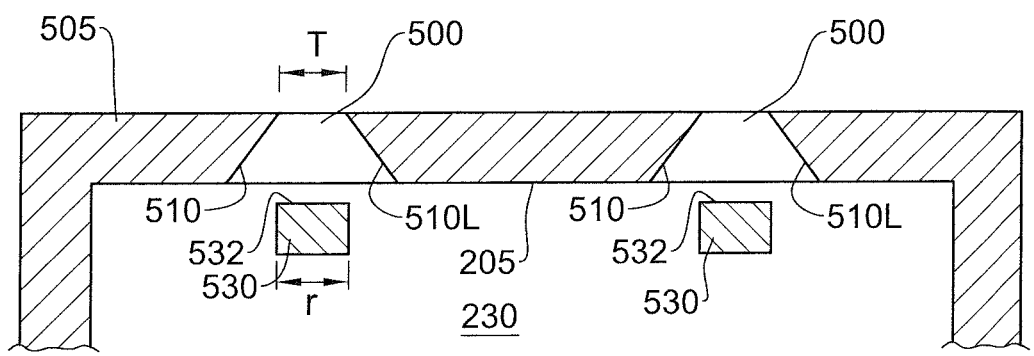
FIG. 9 shows in cross-sectional view of an alternative variation of the example of FIG. 4(a).

In an alternative variation of the above examples the device 100 can be configured to further facilitate supercooled water droplets or ice particles of particular small size to accumulate and block the inlet openings 500, where such a small size is significantly smaller than the width T of the openings 500. For example, and referring to FIG. 9, the device 100 comprises an impact plate element 530 just aft of each of the inlet openings 500. Each plate element 530 has a longitudinal length dimension similar to the length dimension L of the slits 510, and includes an impact surface 532 aligned with the respective slit 510. Furthermore, each impact surface 532 has a width dimension r such as to ensure that the flow area available to the incoming air from airstream AS, between the plate element 530 and the slit 510 is not less than A1. In operation of the device 100, small supercooled water droplets or ice particles that would otherwise pass through the slits 510 instead impact on the respective impact surface 532 of the respective impact plate element 530, enabling ice accretion thereat which eventually blocks the inlet opening 500.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A device for detecting presence of ice in an airstream, the device comprising:
  a housing defining a first chamber and a second chamber, and a partition wall separating the first chamber and the second chamber;
  the first chamber having at least one inlet opening on a front housing wall facing the airstream, and at least one outlet opening, smaller than the at least one inlet opening;
  the second chamber configured for being operatively coupled to at least one electromagnetic (EM) system that is configured for transmitting EM energy to said first chamber at least via said partition wall, said partition wall being at least one of transparent and translucent with respect to said EM energy, said EM energy being configured for melting ice that can accrete with respect to the at least one inlet opening;
  the device being configured for being operatively coupled to at least one air pressure sensor in fluid communication with said first chamber for detecting at least pressure changes in said first chamber responsive to ice accretion on said at least one inlet opening.

2. The device according to claim 1, wherein said at least one air pressure sensor is coupled to said first chamber via a conduit between said first chamber and said at least one air pressure sensor.

3. The device according to claim 1, further comprising at least one opening between said first chamber and said second chamber providing free fluid communication therebetween, and wherein said at least one air pressure sensor is coupled to said second chamber via a conduit between said second chamber and said at least one air pressure sensor.

4. The device according to claim 1, wherein said at least one air pressure sensor is a pressure transducer.

5. The device according to claim 1, wherein the device is made from non-metallic materials.

6. The device according to claim 1, wherein said at least one inlet opening is in the form of at least one slit.

7. The device according to claim 6, and including at least one of the following:
  wherein the slit is in the form of a rectangular slit having a length dimension and a width dimension, the length dimension being greater than the width dimension;
  wherein the slit is in the form of a rectangular slit having a length dimension and a width dimension, the length dimension being greater than the width dimension, and, wherein the length dimension is at least partially vertical with respect to facing airstream;
  wherein the slit is in the form of a rectangular slit having a length dimension and a width dimension, the length dimension being greater than the width dimension, and, wherein the length dimension is vertical with respect to facing airstream;

wherein the slit is in the form of a rectangular slit having a length dimension and a width dimension, the length dimension being greater than the width dimension, and, wherein said length dimension is between 5 mm and 15 mm;

wherein the slit is in the form of a rectangular slit having a length dimension and a width dimension, the length dimension being greater than the width dimension, and, wherein said length dimension is about 10 mm;

wherein the slit is in the form of a rectangular slit having a length dimension and a width dimension, the length dimension being greater than the width dimension, and, wherein said width dimension is between 0.15 mm and 0.65 mm;

wherein the slit is in the form of a rectangular slit having a length dimension and a width dimension, the length dimension being greater than the width dimension, and, wherein said width dimension is about 0.6 mm;

wherein the slit is in the form of a rectangular slit having a length dimension and a width dimension, the length dimension being greater than the width dimension, and, wherein a ratio of said length dimension to said width dimension is between 7.7 and 100;

wherein the slit is in the form of a rectangular slit having a length dimension and a width dimension, the length dimension being greater than the width dimension, and, wherein a ratio of said length dimension to said width dimension is about 16.67;

wherein said at least one slit has longitudinal edges that diverge in an aft direction through a thickness of said front housing wall;

wherein said at least one slit has longitudinal edges that are parallel to one another through a thickness of said front housing wall; or wherein said at least one slit has longitudinal edges that are parallel to one another through a thickness of said front housing wall, and, wherein said longitudinal edges are angled with respect to a front face of said front housing wall;

comprising two said slits transversely spaced from one another.

8. The device according to claim 1, including at least one of the following:
wherein said EM system is configured for providing laser energy of wavelength of about 1470 nm or about 1550 nm;
wherein said EM system is configured for providing laser energy of intensity between 0.01 W/mm$^2$ and 0.1 W/mm$^2$;
wherein said EM system is configured for providing laser energy of intensity 0.03 W/mm$^2$;
wherein said EM system is further configured for directing said laser energy toward said front housing wall;
wherein said EM system is configured for directing said laser energy toward said at least one outlet opening; or
wherein said EM system comprises at least one optical fiber accommodated in said second chamber for transmitting EM energy along a respective optical axis.

9. The device according to claim 1, wherein the at least one outlet aperture includes a surface tension breaker.

10. The device according to claim 9, wherein said surface tension breaker includes a mechanical stop located just aft of the outlet opening.

11. The device according to claim 10, including at least one of the following:
wherein said mechanical stop is located just aft of the outlet opening;
wherein said mechanical stop projects generally towards and into said outlet opening, and further projects outwards in a general direction away from said outlet opening; or
wherein said mechanical stop comprises a continuous surface between an inside of the outlet opening and an outside of the device.

12. A device for detecting presence of ice in an airstream, the device comprising:
a housing defining a first chamber;
the first chamber having at least one inlet opening on a front housing wall facing the airstream, and at least one outlet opening, smaller than the at least one inlet opening;
the device configured for being operatively coupled to at least one electromagnetic (EM) laser system that is configured for transmitting EM laser energy to said first chamber, said EM laser energy being configured for melting ice that may accrete on said front wall, especially the at least one inlet opening;
the device being configured for being operatively coupled to at least one air pressure sensor in fluid communication with said first chamber for detecting at least pressure changes in said first chamber responsive to ice accretion on said at least one inlet opening.

13. A device for detecting presence of ice in an airstream, the device comprising:
a housing defining a first chamber having at least one inlet opening on a front housing wall facing the airstream, and at least one outlet opening, smaller than the at least one inlet opening;
said first chamber being configured for coupling to at least one air pressure sensor to provide fluid communication with said first chamber for detecting at least pressure changes in said first chamber responsive to ice accretion on said at least one inlet opening;
the at least one inlet opening being in the form of at least two slits, the at least two slits being at least partially vertical with respect to facing airstream;
wherein each of the two slits is in the form of a rectangular slit having a length dimension and a width dimension, the length dimension being greater than the width dimension; and
wherein the at least two slits are transversely spaced from one another.

14. The device according to claim 13, including at least one of the following:
wherein the length dimension is at least partially vertical with respect to facing airstream;
wherein the length dimension is vertical with respect to facing airstream;
wherein said length dimension is between 5 mm and 15 mm;
wherein said length dimension is about 10 mm;
wherein said width dimension is between 0.15 mm and 0.65 mm;
wherein said width dimension is about 0.6 mm;
wherein a ratio of said length dimension to said width dimension is between 7.7 and 100;
wherein said at least one slit has longitudinal edges that diverge in an aft direction through a thickness of said front housing wall; or
wherein said at least one slit has longitudinal edges that are parallel to one another through a thickness of said front housing wall, and wherein optionally said longitudinal edges are angled with respect to a front face of said front housing wall.

15. A device for detecting presence of ice in an airstream, the device comprising:
a housing defining a first chamber having at least one inlet opening on a front housing wall facing the airstream, and at least one outlet opening, smaller than the at least one inlet opening;
said first chamber being configured for coupling to at least one air pressure sensor to provide fluid communication with said first chamber, for detecting at least pressure changes in said first chamber responsive to ice accretion on said at least one inlet opening;
wherein the at least one outlet aperture includes a surface tension breaker in the form of a mechanical stop;
the at least one aperture comprising an outlet edge, and wherein said mechanical stop projects aft of the outlet edge.

16. The device according to claim 15, including at least one of the following:
wherein said mechanical stop has a generally cylindrical or spherical shape;
wherein said mechanical stop projects generally towards and into said outlet opening; or
wherein said mechanical stop comprises a continuous surface between an inside of the outlet opening and an outside of the device.

17. The device according to claim 15, the device being further configured for coupling to at least one electromagnetic (EM) system that is configured for transmitting EM energy to said first chamber, said EM energy being configured for melting ice that can accrete with respect to the at least one inlet opening.

* * * * *